March 12, 1957     I. NURKIEWICZ     2,784,732
VALVES FOR POWDER FIRE EXTINGUISHERS
Filed March 11, 1953
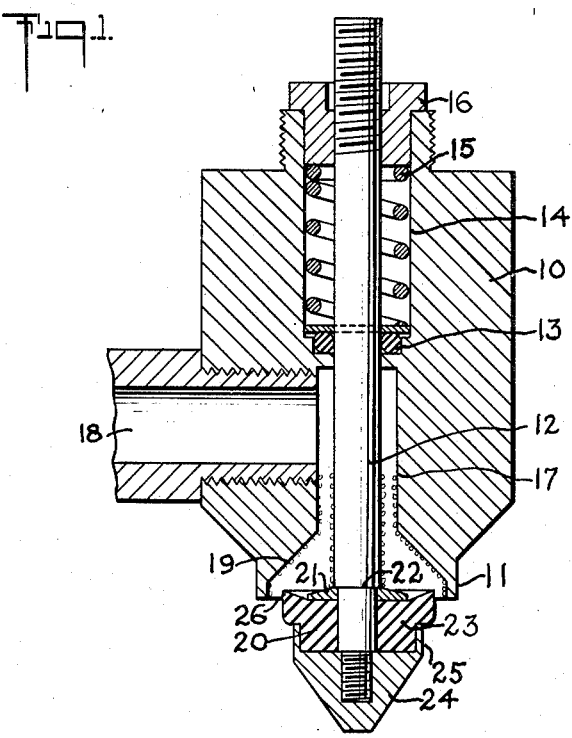
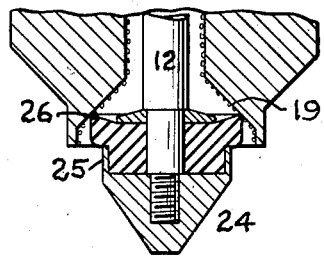
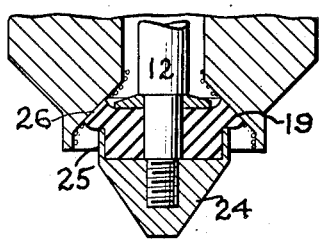
INVENTOR
IGNATIUS NURKIEWICZ
BY
ATTORNEY

2,784,732
VALVES FOR POWDER FIRE EXTINGUISHERS

Ignatius Nurkiewicz, Brooklyn, N. Y., assignor to Stop-Fire, Inc., Brooklyn, N. Y., a corporation of New York Application March 11, 1953, Serial No. 341,687

3 Claims. (Cl. 137—244)

This invention relates to a valve for fire extinguishers of the type in which a powdered fire extinguishing material is expelled from a container by gas, under pressure. With such an extinguisher it is desirable to discharge such quantity of material as may be required to extinguish a particular fire, and then to shut off the flow, leaving the remainder of the powder, and the remainder of the gas supply for use on the next occasion.

With the types of valves heretofore in use, usually having cooperating mating valve surfaces which come together to shut off the flow, difficulty is experienced after first use in getting a reclosure tight enough to retain the gas pressure, because grains of the powdered material adhere to the valve surfaces and prevent them from coming into complete contact. Although the powdered material is quite fine, the parts are held far enough apart to permit leakage.

In accordance with this invention one of the valve surfaces is made of a hard material, such as brass, and the other of a soft material, and the surfaces are so designed that they meet with a wiping action which wipes all, or substantially all of the dust off the hard surface at the place where the sealing contact is to be made. At the same time, the parts are so designed that during the closing action, the softer surface, which commences the contact with a line contact, is squeezed out to an area contact. If any dust particles should remain on the hard surface, the soft material closes around it, making a gas tight contact, notwithstanding the intruding grains.

The following description discloses the preferred form of the invention, which is illustrated in the accompanying drawings, in which Fig. 1 is a central vertical section of the valve, with the valve open for discharge, Fig. 2 is a fragmentary section of the valve parts as the valve surfaces first come into contact, during closing. Fig. 3 is a similar view to Fig. 2, but with the surfaces in full closing engagement.

In the drawings, the numeral 10 designates the valve body which will be attached to the extinguisher container (not shown) in any customary manner, as by having a neck 11 forced into, or screwed into, the top of a container. The body carries a valve operating rod 12 mounted in a bearing 13. An upper bore 14 in the head, carries a spring 15 confined between the bearing 13, and a nut 16 adjustably mounted on the end of the rod. This nut 16, itself, slides with the rod in the upper bore 14.

The body 10 has a bore 17 in its lower end, concentric with the rod 12, which bore communicates with the discharge orifice 18 which, as will be understood, will be connected with the discharge hose of the nozzle (not shown), in the usual manner.

In accordance with this invention there is provided within the body, as shown within the neck 11, a downwardly flaring conical valve surface 19, concentric with the rod 12. The valve head 20 comprises a washer 21, fitting against a shoulder 22 upon the rod, against which a rubber valve element 23 is firmly held, by a nut 24 screwed upon the rod. This nut has a recess in its upper surface leaving a circumferential flange 25 to surround the lower end of the valve element 23 to hold it centered and to confine the outer periphery of the valve element as it is distorted under the pressure of closing.

This element 23 has a comparatively sharp peripheral edge 26 on its upper side, at a point where it first encounters the surface 19, during the upward, or closing movement of the valve head. It is, moreover, desirable that this edge shall not be too blunt, since the full advantages of the invention are obtained by the wiping action of this edge over the surface 19 during the closing, and by the inward compression of this edge by the pressure of the spring 15. As shown, the upper surface of the valve element 23 is concaved, and this concavity is somewhat emphasized by the compression between the nut 24 and the washer 21.

When the valve is open, as shown in Fig. 1, the gas borne powder is carried freely out of the container. Some will adhere to the valve surface 19, and some will settle on the upper face of the element 23. As the closing movement commences the edge 26 comes in contact with the valve surface 19, as shown in Fig. 2. As the valve continues to move upward the edge 26 starts to slide upwardly along the surface 19, wiping off of it all the powder that may be adhering thereto, and leaving a clean surface as it goes. Meanwhile, because of the conical character of its surface 19, the edge 26 of the element 23 is crowded in toward the center, increasing the surface of contact between it and the surface 19, and at the same time increasing the pressure of contact.

The best results have been obtained with this valve when the rubber is of a 65 Shore hardness, but it will be understood that other materials having like properties may be used instead of rubber.

With this construction it has been found that the contents of the extinguisher may be discharged a little at a time until the supply is exhausted, and yet the valve will be gas tight every time it is closed.

The foregoing description is intended as illustrative and it is not intended to be considered in a limiting sense. The scope of the invention being given in the claims.

What I claim:

1. A valve for a fire extinguisher of the type comprising a container containing a powder and a compressed gas and adapted to project a stream of gas-borne powder on a flame comprising a valve body having an inlet and outlet and adapted to be attached to a container and having a conical valve seat in said inlet, a stem movable in said body carrying a valve head comprising a resilient member held between a washer and a nut on said stem and said resilient member having a slightly dished surface adjacent to the valve seat to form a sharpened circumferential edge to engage said valve seat, said washer having a much smaller diameter than the surface of said resilient member adjacent said seat and said nut being of a diameter greater than said washer and less than said resilient member to furnish support to said resilient member on an intermediate diameter between the washer and the seat engaging edge, said circumferential seat-engaging edge being adapted to be deformed inwardly and radially when it is urged against said valve seat, so as to wipe powder therefrom and leave a free space behind it with which other portions of the resilient member may contact to form a tight closure.

2. A device according to claim 1 in which the lower nut is cup-shaped having a circumferential flange to give said support to the resilient member at said intermediate diameter.

3. A device according to claim 1, in which the dished face of the resilient member is inclined toward the seat-engaging edge at an angle less than 45°.

References Cited in the file of this patent

UNITED STATES PATENTS

| | | | |
|---|---|---|---|
| Re. 17,022 | Wilson | July 3, | 1928 |
| 21,332 | Fuller | Aug. 31, | 1858 |
| 963,060 | Noppel | July 5, | 1910 |
| 1,195,253 | Naslund | Aug. 22, | 1916 |
| 1,365,369 | Boyce | Jan. 11, | 1921 |
| 1,552,101 | Weichman | Sept. 1, | 1925 |
| 1,556,923 | Florence | Oct. 13, | 1925 |
| 1,568,159 | Heywood | Jan. 5, | 1926 |
| 1,805,537 | Allan | May 19, | 1931 |
| 2,148,850 | Deakins | Feb. 28, | 1939 |
| 2,260,381 | Kennon | Oct. 28, | 1941 |
| 2,301,653 | Wells | Nov. 10, | 1942 |
| 2,470,744 | Korn | May 17, | 1949 |
| 2,521,314 | Therolf | Sept. 5, | 1950 |
| 2,593,740 | Faust | Apr. 22, | 1952 |

FOREIGN PATENTS

| | | | |
|---|---|---|---|
| 5,652 | Great Britain | Mar. 18, | 1901 |
| 591,449 | France | Apr. 9, | 1925 |
| 634,352 | Germany | Aug. 25, | 1936 |